United States Patent [19]

Hovanchak

[11] Patent Number: 4,811,813

[45] Date of Patent: Mar. 14, 1989

[54] CENTER TAKE-OFF ELECTRIC RACK AND PINION STEERING GEAR

[75] Inventor: John A. Hovanchak, Utica, Mich.

[73] Assignee: TRW Inc., Lyndhurst, Ohio

[21] Appl. No.: 15,281

[22] Filed: Feb. 17, 1987

[51] Int. Cl.⁴ .............................................. B62D 5/04
[52] U.S. Cl. .................................................. 180/79.1
[58] Field of Search ............................. 180/79.1, 148; 74/388 PS, 498

[56] References Cited

U.S. PATENT DOCUMENTS

| | | | |
|---|---|---|---|
| 4,373,599 | 2/1983 | Walter et al. | 180/148 |
| 4,415,054 | 11/1983 | Drutchas | 180/79.1 |
| 4,577,715 | 3/1986 | Saito | 180/79.1 |
| 4,653,602 | 3/1987 | Anders et al. | 180/79.1 X |
| 4,666,014 | 5/1987 | Carlson | 180/79.1 |
| 4,683,971 | 8/1987 | Westercamp et al. | 180/79.1 |

FOREIGN PATENT DOCUMENTS 55-47963 5/1980 Japan.

OTHER PUBLICATIONS

Automotive Technology International 1987., p. 124, Column 1, last full paragraph.
Brochure entitled "TRW Powertronic TM Electronically Controlled Steering-A Turn Toward the Future".
Brochure entitled "TRW Electronically Controlled Steering (ECS) System".

Primary Examiner—John A. Pekar
Attorney, Agent, or Firm—Tarolli, Sundheim & Covell

[57] ABSTRACT

A steering gear includes an elongate member having a screw thread portion adjacent one end thereof and a rack portion adjacent the other end thereof. The steering gear also includes a steering input shaft and a pinion gear rotatable by the input shaft. The pinion gear meshes with the rack portion of the elongate member. An electric motor is adjacent the screw thread portion of the elongate member. A ball nut is rotatable by said electric motor and cooperates with the screw thread portion to move the elongate member axially upon rotation of the ball nut. A linkage is attached to the elongate member intermediate the screw thread portion and the rack portion to effect axial movement of the linkage upon axial movement of the elongate member. The linkage turns steerable vehicle wheels upon movement of the linkage.

15 Claims, 6 Drawing Sheets

CENTER TAKE-OFF ELECTRIC RACK AND PINION STEERING GEAR

BACKGROUND OF THE INVENTION

1. Technical Field

The present invention relates to an electric power assist steering gear for a vehicle and particularly relates to a center take-off rack and pinion power assist steering gear.

2. Description of the Prior Art

Center take-off rack and pinion hydraulic power assist steering gears are known. Typically, such a steering gear includes an elongate member which moves axially. The elongate member has a rack portion which engages teeth of a pinion gear. The pinion gear is rotated by a steering input shaft. Upon rotation of the input shaft, a directional control valve is actuated. The valve modulates, in accordance with steering input torque, pressurized fluid flow to a hydraulic motor which applies an assist force to the elongate member to axially move the elongate member. The hydraulic motor includes a piston located in a fluid chamber and connected to the elongate member. A linkage is connected to a central portion of the elongate member. The linkage effects turning of the vehicle steerable wheels upon axial movement of the elongate member. The rack and pinion gear set act as a servo mechanism providing feedback to the valve for aiding in control of flow to the hydraulic motor.

The known center take-off hydraulic power assist rack and pinion steering gear commonly have the piston connected to the end of the elongate member. The surface area of the piston against which the fluid pressure acts to move the piston in one direction is different than the area against which the fluid pressure acts to move the piston in the opposite direction. The fluid pressure acts on the entire area of the piston when moving the piston in one direction, whereas when moving the piston in the opposite direction, the fluid pressure acts on the area of the piston minus the area of the elongate member where it attaches to the piston. This has resulted in complications in the design of center take-off hydraulic power assist rack and pinion steering gear.

Electric assist rack and pinion steering gear is also known. One electric assist rack and pinion steering gear is disclosed in U.S. Pat. No. 4,415,054. The steering gear of U.S. Pat. No. 4,415,054 includes a movable elongate member having a rack portion and a screw thread portion. A manually rotatable pinion engages the rack portion of the elongate member. An electric motor encircles the screw thread portion of the elongate member and rotates a ball nut which also encircles the screw thread portion. The ball nut applies an axial force to the screw thread portion of the elongate member to effect axial movement of the elongate member in response to actuation of the electric motor.

SUMMARY OF THE INVENTION

The present invention is an electric power assist rack and pinion steering gear with center take-off. The steering gear includes an elongate member having a screw thread portion adjacent one axial end of the elongate member and a rack portion adjacent the other axial end. A pinion gear meshes with the rack portion of the elongate member. The pinion gear is connected with and rotated by a steering input shaft. An electric motor is disposed adjacent the screw thread portion of the elongate member. A ball nut encircles the screw thread portion and is rotated by the electric motor. The ball nut applies an axial force to the elongate member to move the elongate member axially upon rotation of the ball nut. A linkage is connected with the elongate member intermediate the screw thread portion and the rack portion. The linkage is connected with the steerable wheels of the vehicle to turn the steerable wheels upon axial movement of the elongate member.

The elongate member is at least partially supported by an elongate central housing. A pinion gear housing supports the pinion gear and has an end portion releasably attached to a first end portion of the elongate central housing. An electric motor housing supports the electric motor and is releasably attached to a second end portion of the elongate central housing. The elongate central housing has a slot therein through which fasteners extend to connect the elongate member with the linkage.

The electric motor is disposed coaxially of the ball nut and screw thread and is spaced axially from the ball nut. The screw thread portion of the elongate member has an end which is located within the axial extent of the electric motor when the vehicle wheels are in a straight-ahead position. The end of the screw thread portion is movable therefrom to a location within the axial extent of the ball nut when the steerable wheels of the vehicle are turned in one direction.

BRIEF DESCRIPTION OF THE DRAWINGS

Further features of the present invention will become apparent to those skilled in the art to which the present invention relates from reading the following specification with reference to the accompanying drawings, in which:

FIG. 6 is a view similar to FIG. 5 showing some parts in a different position.

DESCRIPTION OF A PREFERRED EMBODIMENT

Figure 1:
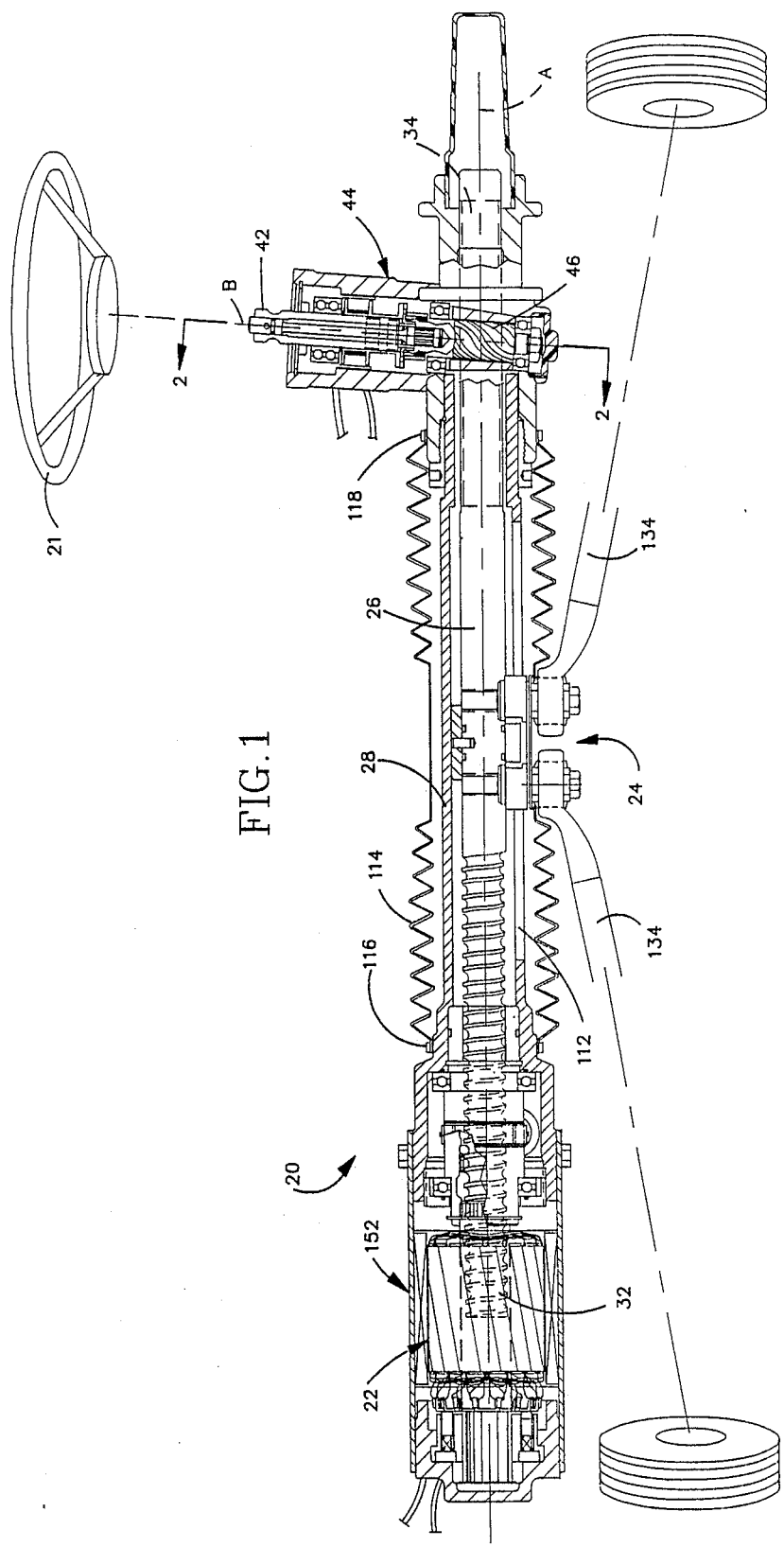
FIG. 1 is a schematic view of a steering gear of the present invention in a vehicle showing the steering gear in section.

A vehicle power assist steering gear 20 embodying the present invention is illustrated in FIG. 1. The steering gear 20 is connectable with the steering wheel 21 of the vehicle. The steering gear 20 is a center take-off rack and pinion steering gear. A linkage assembly 24 extends from a central portion of the steering gear 20 and is connected with the steerable wheels of the vehicle to apply a steering force to the wheels when the linkage assembly 24 is moved. The connection of the linkage assembly 24 to the steerable wheels is schematically shown in FIG. 1.

The linkage assembly 24 is also connected with an elongate member 26 of the steering gear 20. The elongate member 26 is supported for movement along its longitudinal axis A. When the elongate member 26 moves along its longitudinal axis A, the linkage 24 moves to turn the steerable vehicle wheels. An electric motor 22 assists movement of the elongate member 26 as will be described hereinbelow.

Figure 2:
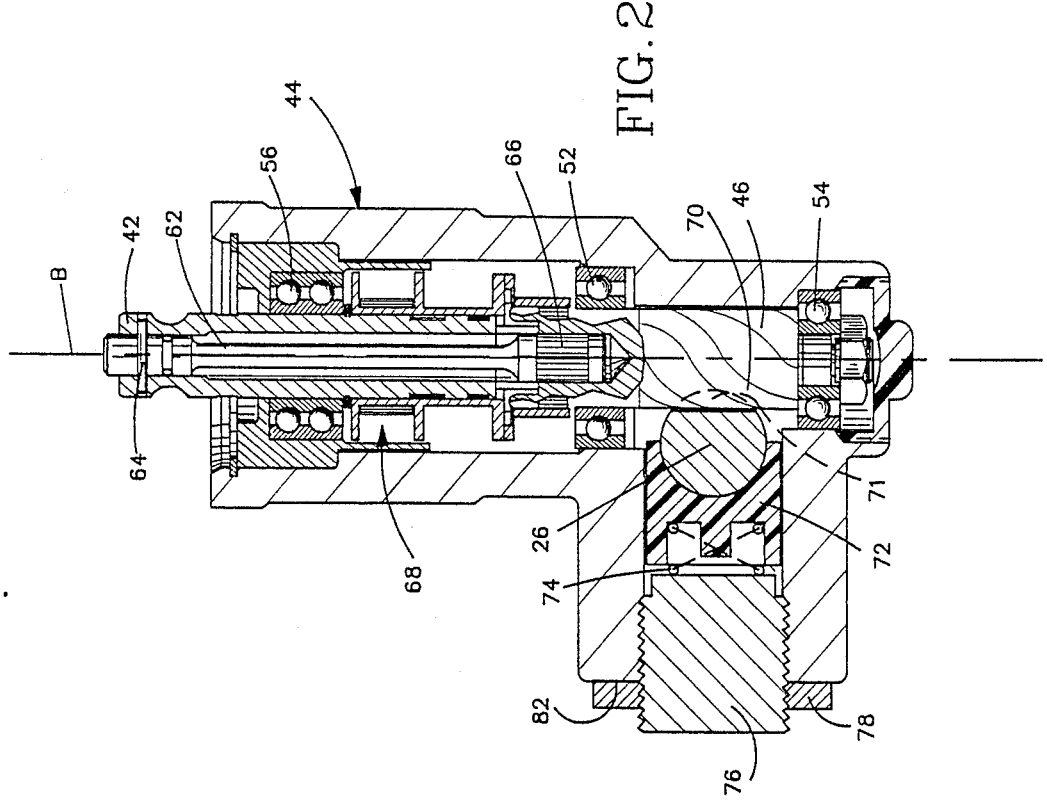
FIG. 2 is a cross sectional view taken approximately along the line 2—2 of FIG. 1.
Figure 3:
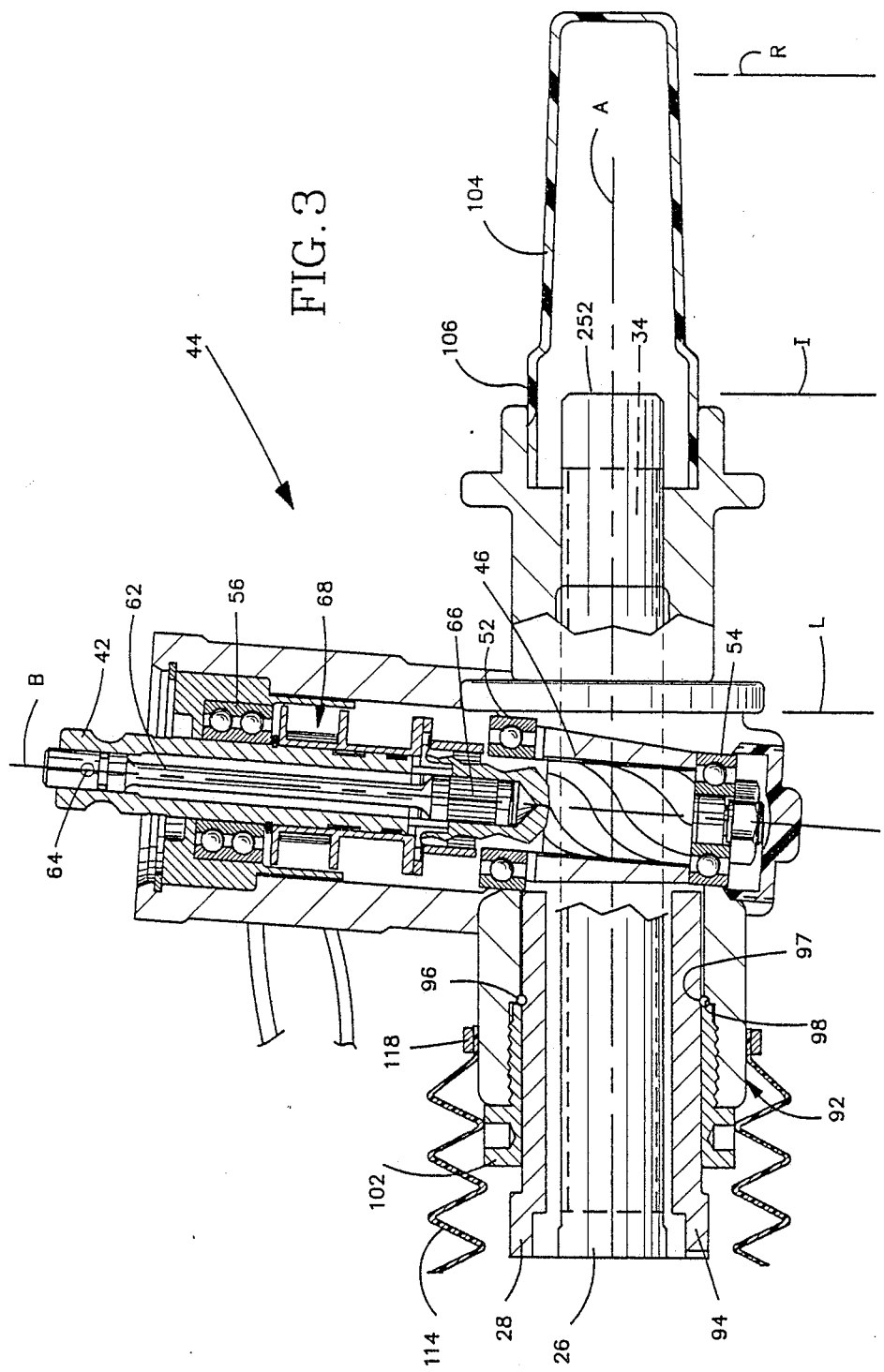
FIGS. 3-6 are enlarged sectional views of different portions of the steering gear of FIG. 1.

The elongate member 26 has a screw thread portion 32 adjacent its left axial end, as viewed in FIG. 1, and a rack portion 34 adjacent its right axial end. A pinion gear 46 meshes with the rack portion 34 of the member 26. The pinion gear 46 is located in a pinion gear housing 44. A steering input shaft 42 extends outwardly from the pinion gear housing 44. The vehicle steering wheel 21 is connected with the input shaft 42. The input shaft 42 is connected with the pinion gear 46 (FIGS. 2 and 3). The input shaft 42 and pinion gear 46 are disposed coaxially along a common central axis B. The pinion gear 46 is supported by bearings 52, 54 for rotation relative to the pinion gear housing 44. The input shaft 42 is supported by a bearing 56 for rotation relative to the pinion gear housing 44.

The input shaft 42 is connected with the pinion gear 46 by a torsion bar 62 extending coaxially within the input shaft 42 and pinion gear 46. The torsion bar 62 is connected to the input shaft 42 by a pin 64 extending transversely therethrough. The torsion bar 62 has a splined axial end portion 66 which has a press fit with an inner cylindrical surface of the pinion gear 46.

The pinion gear housing 44 encloses one of a variety of known torque sensors 68, shown schematically in FIG. 2. The torque sensor 68 functions to sense the amount and direction of relative rotation between the input shaft 42 and pinion gear 46. The torque sensor 68 generates an electrical signal in response to relative rotation between the input shaft 42 and pinion gear 46. The signal actuates the electric power assist motor 22 to control the amount and direction of assist, as is known.

The pinion gear 46 has teeth 70 (FIG. 2) which meshingly engage teeth 71 formed in the rack portion 34 of the elongate member 26. A yoke 72 engages the elongate member 26 diametrically opposite the pinion gear 46. The yoke 72 is biased by a spring 74 to the right, as viewed in FIG. 2, to maintain the rack portion 34 of the elongate member 26 in meshing engagement with the pinion gear 46. The spring 74 is compressed between the yoke 72 and an end plug 76 threaded into the pinion gear housing 44. The biasing force of the spring 74 is adjustable by varying the axial distance the end plug 76 is threaded into the pinion gear housing 44. Once the end plug 76 is in a desired position, it is retained in that position by threading a lock nut 78 over the end plug 76 and against an end surface 82 of the pinion gear housing 44.

The entire pinion gear housing 44 is removably attached to an elongate central housing member 28. The pinion gear housing 44 has a tubular portion 92 (FIG. 3) which receives a tubular end portion 94 of the elongate central housing member 28. A snap ring 96 is received in a groove 97 in the tubular end portion 94 of the elongate central housing member 28. The snap ring 96 engages an inner shoulder portion 98 of the pinion gear housing 44 to establish the position in which the tubular end portion 94 may axially extend into the tubular portion 92 of the pinion gear housing 44. A nut 102 is threaded into the tubular portion 92 of the pinion gear housing 44 against the snap ring 96. This releasably locks the tubular portion 92 of the pinion gear housing 44 to the tubular end portion 94 of the elongate central housing member 28.

An end cap 104 projects from the right end, as viewed in the drawings, of the pinion gear housing 44. The end cap 104 is press fit into an opening 106 in the pinion gear housing 44 to prevent contaminants from entering the pinion gear housing 44. The rack portion 34 of the elongate member 26 moves axially within the end cap 104.

Figure 4:
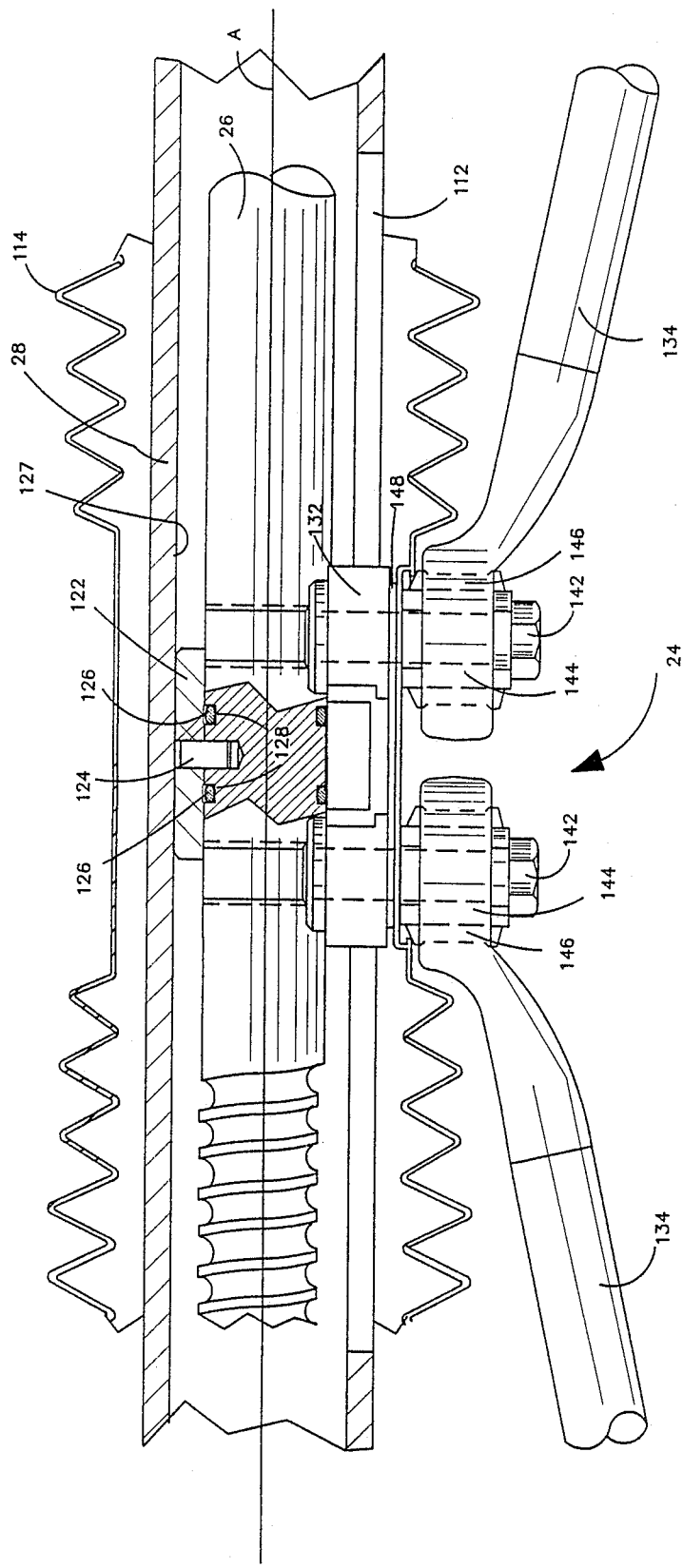

The elongate central housing member 28 is preferably an aluminum die casting. The elongate central housing member 28 (FIG. 4) includes surfaces which define an elongate slot 112 therein. The elongate slot 112 extends in a direction parallel to the longitudinal axis of the elongate central housing member 28 which corresponds to the longitudinal axis A of the elongate member 26.

A plastic bearing 122 (FIG. 4) assists in supporting the elongate member 26 for axial movement relative to the elongate central housing member 28. The plastic bearing 122 is preferably molded from a suitable nylon material. The plastic bearing 122 is connected to the elongate member 26 by a dowel pin 124. The plastic bearing 122 moves along an inner surface 127 of the elongate central housing member 28 upon axial movement of the elongate member 26.

A bearing block 132 is also connected to the elongate member 26 diametrically opposite the plastic bearing 122. The bearing block 132 is located in slot 112 and is guided by parallel side surfaces of the slot 112. The slot 112 and bearing block 132 thus cooperate to restrain the elongate member 26 from rotational or transverse movement relative to the elongate central housing member 28 and guide the elongate member for axial movement along the axis A.

O-rings 126 are disposed in grooves 128 in the elongate member 26. The O-rings 126 are elastically deformed and exert a biasing force against the plastic bearing 122 and bearing block 132 when the parts are fastened together.

The linkage assembly 24 is connected with the elongate member 26 intermediate the rack portion 34 and screw thread portion 32 of the elongate member. A pair of tie rods 134 of the linkage 24 are connected through the slot 112 in the elongate central housing member 28 with the elongate member 26 by a pair of bolts 142. Each of the bolts 142 extend through a respective metal sleeve 144 which is encircled by a rubber grommet 146, a plate washer 148 and through an opening in the bearing block 132. Thus, the tie rods 134 are free to pivot relative to the elongate member 26 about the bolts 142 during axial movement of the elongate member.

A bellows 114 (FIG. 1) is attached to the elongate central housing member 28 by a clamp 116 and to the pinion gear housing 44 by a clamp 118. The bolts 142 extend through openings in the bellows 114. Thus, the bellows 114 is attached to the linkage assembly 24 and is axially expandable and contractable with movement of the linkage assembly along the slot 112. The bellows 114 encloses the elongate central housing member 28 to prevent contaminants from entering the steering gear 20 through the slot 112.

The electric assist motor 22 is located at the left end, as viewed in FIG. 1, of the steering gear 20. The electric assist motor 22 is disposed coaxially about the screw thread portion 32 of the elongate member 26. A motor housing 152 (FIG. 5), which supports the electric assist motor 22, is removably connected with the elongate central housing member 28 by screws 154. Wires 156 extend into an end cap 242 supporting a brush box 155 and the motor housing 152 for communicating current to he motor 22.

The electric assist motor 22 includes an armature 162 surrounded by circumferentially spaced apart permanent magnets 164 secured to the interior of the motor housing 152. A tubular connector or drive shaft 172 is attached to and extends axially from both ends of the armature 162. The left end, as viewed in FIG. 5, of the tubular connector 172 is supported by a bearing 176 which is supported by the end cap 242. The screw thread portion 32 of the elongate member 26 is partially located within the armature 162 and the tubular connector 172 when the steering gear 20 is in the position illustrated in FIGS. 1 and 5. When the electric power assist motor 22 is energized, the armature 162 and the tubular connector 172 rotate.

A ball nut assembly 182 is disposed in a chamber 180 in the elongate central housing member 28. The ball nut assembly 182 is coaxial with the electric motor 22 and axially spaced from the motor. The ball nut assembly 182 encircles a portion of the screw thread portion 32 of the elongate member 26 and drivingly engages the screw thread portion 32 of the elongate member 26 to move the elongate member 26 axially.

The ball nut assembly 182 includes a generally cylindrical ball nut member 184. An inner surface of an end portion 186 of the ball nut member 184 has inwardly directed splines that are drivingly engaged by outwardly projecting splines located on an end portion 188 of the tubular connector 172. Thus, as the armature 152 and tubular connector 172 rotate, the ball nut member 184 rotates. A C-shaped clip 190 is inserted through a slot 199 in the ball nut 184 and into a groove 200 in the tubular connector 172. The legs of the C-shaped clip 190 extend through another slot 199a in the ball nut 184. Thus, the clip 192 prevents relative axial movement between the tubular connector 172 and the ball nut member 184.

The ball nut assembly 182 also includes a plurality of balls 192 which provide a mechanical coupling between an interior threaded portion of the ball nut member 184 and the screw thread portion 32 of the elongate member 26. A recirculation tube 194 is attached to the ball nut member 184 to recirculate the balls 192 during rotation of the ball nut member, as is known. As the electric assist motor 22 rotates the tubular connector 172 and thus the ball nut member 184, the balls 192 force the elongate member 26 to move along the axis A. The ball nut assembly 182 thus acts as a gear box which converts rotary motion of the electric motor 22 into axial movement of the elongate member 26. Annular felt wipers 196 are positioned at opposite inner ends of the ball nut member 184 to prevent contaminants from contacting balls 192. The felt wipers 196 are held in place by pins 198 which extend radially through the ball nut member 184 and into the felt wipers.

A thrust bearing 202 is positioned between an end of the ball nut member 184 and an interior shoulder portion 204 of the elongate central housing member 28. Another thrust bearing 206 is positioned between the opposite end of the ball nut member 184 and the bottom of a recess 209 of a spanner nut 208. The spanner nut 208 is threaded into the elongate central housing member 28. The spanner nut 208 is threaded into the elongate central housing member 28 a sufficient amount to restrain the ball nut assembly 182 from axial movement. The bearings 202 and 206 are not trapped radially and thus some radial movement of the bearings 202, 206 and ball nut assembly 182 is possible.

A respective O-ring 212 is disposed in an annular groove between each of the bearings 202, 206 and the shoulder portion 204 and spanner nut 208. The O-rings 212 resist radial movement of the ball nut member 184 and permit a small amount of axial movement of the ball nut member. The O-rings 212 are made from an elastomeric material. The O-rings 212 permit a small amount of axial movement of the ball nut member 184 since the O-rings can compress slightly when the spanner nut 208 is threaded into the elongate central housing member 28. Whenever the ball nut member 184 is rotated in one direction, the ball nut member moves slightly in an axial direction resulting from the forces applied to the elongate member 26. The O-rings 212 exert a frictional force against the bearings 202, 206 to resist radial movement therebetween. Such a floating ball nut arrangement is disclosed in U.S. patent application Ser. No. 861,054, filed May 8, 1986 now U.S. Pat. No. 4,666,014 and assigned to the assignee of the present invention.

The screw thread portion 32 of the elongate member 26 is supported for movement by a bearing 222. The bearing 222 extends axially along the screw thread portion 32 for a length sufficient to engage at least four crests of the screw thread portion. A small radial clearance exists between the outer diameter of the bearing 222 and a surface portion 224 of the elongate central housing member 28 receiving the bearing. This clearance permits some radial movement of the bearing 222 and thus the screw thread portion 32 of the elongate member 26 relative to the elongate central housing member 28.

An O-ring 226 which is disposed in an annular groove in the bearing 222 takes up the radial clearance between bearing 222 and the elongate central housing member 28. The O-ring 226 is made from an elastomeric material and compresses under radial movement of the bearing 222. The O-ring 226 resiliently deforms to resist radial movement of the bearing 222, thus biasing the bearing to a radially centered position relative to the elongate central housing member 28. The bearing 222 is located axially adjacent a shoulder portion 228 of the elongate central housing member 28. The bearing 222 is retained in an axial position relative to the elongate central housing member 128 by a snap ring 232 disposed in a groove 234.

Figure 5:
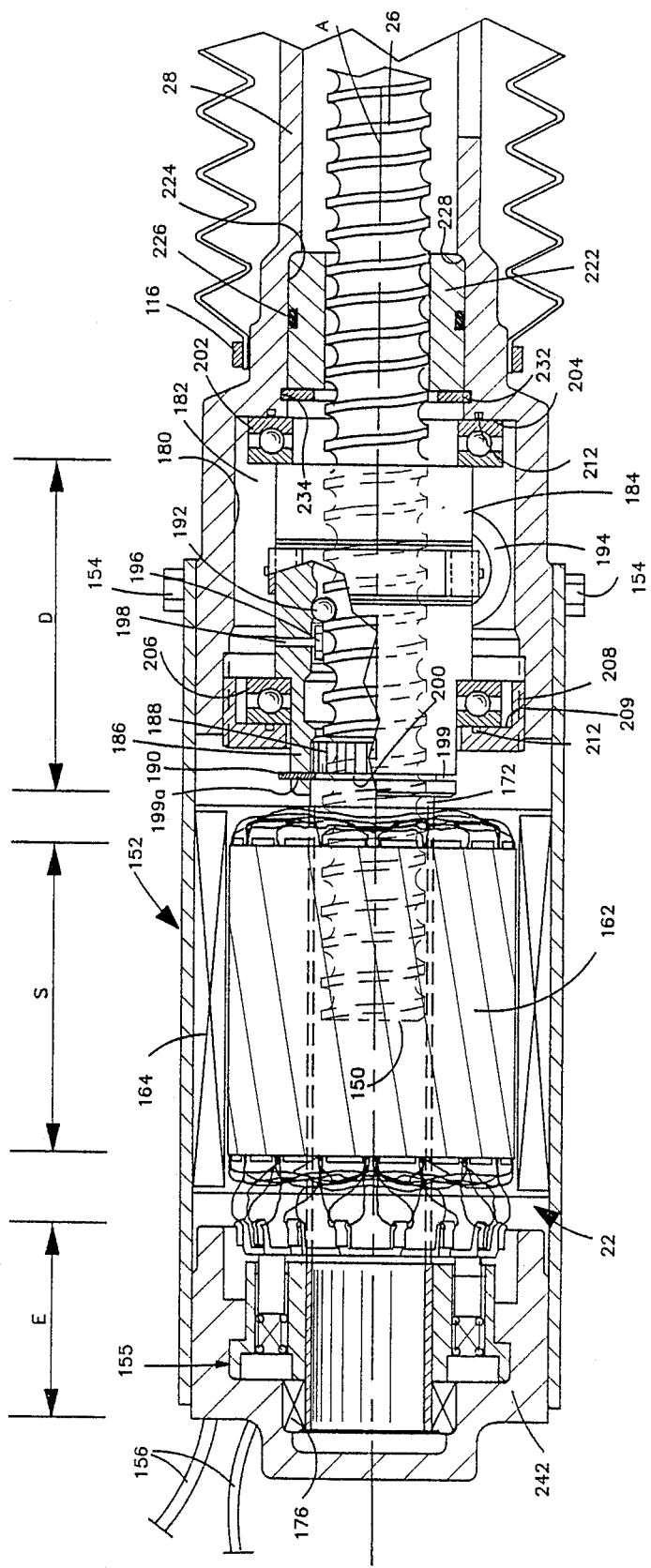
Figure 6:
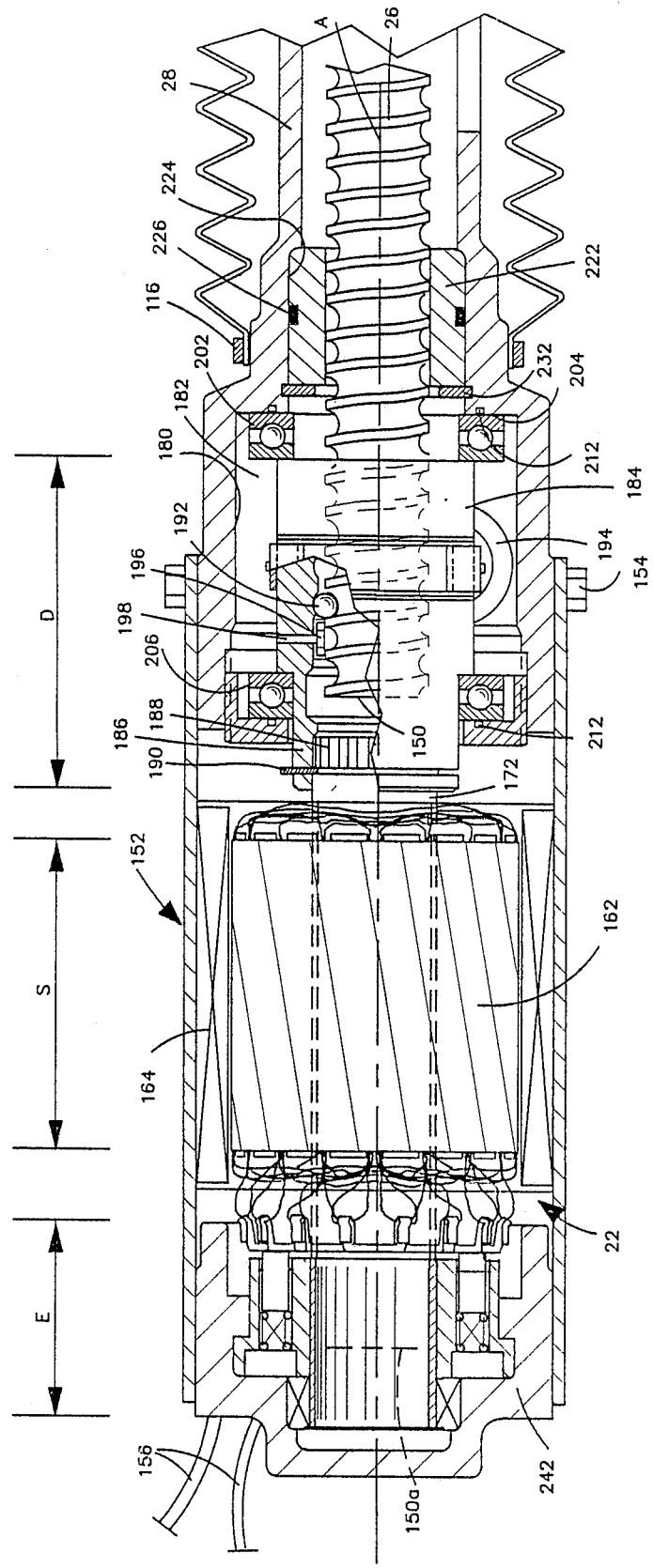

The end surface 150 of the screw thread portion 32 of the elongate member 26 at the left end thereof, as viewed in FIG. 5, is disposed within the axial extent S of the armature 162 of the electric assist motor 22 when the vehicle wheels are in a straight-ahead position. The end surface 150 of the elongate member 26 is movable in either direction along the axis A from this position. For example, when the vehicle is moving forward and the vehicle operator rotates the steering wheel and thus the input shaft to steer the vehicle to make a turn in one direction, the end surface 150 moves from within the axial extent S of the electric motor 22 to within the axial extent D of the ball nut member 184, as viewed in FIG. 6. If the vehicle operator rotates the steering wheel to make a turn in an opposite direction, the end surface 150 moves axially outward of the axial extent S of the electric motor 22 to within the axial extent E of the end cap 242 connected with the motor housing 152 and to a position indicated by the line 150a shown in FIG. 6.

It should be apparent that when the elongate member 26 is moved axially to the right, as viewed in FIG. 1, so that the end surface 150 is within the axial extent D (FIGS. 5 and 6) of the ball nut member 184, the opposite axial end surface 252 (FIG. 3) of the elongate member is moved from the position indicated by line I toward the right to a position indicated by line R. When the elongate member 26 is moved axially to the left, as viewed in FIG. 1, so the end surface 150 is within the axial extent E (FIGS. 5 and 6) of the end cap 242, the end surface 252 is moved toward the left to the position indicated by Line L.

While the preferred embodiment illustrates motor 22 as being coaxial with elongate member 26, the motor could be offset from the elongate member. For example, the output shaft of the motor could be parallel to the elongate member, perpendicular to the elongate member or at an angle to the elongate member. In these cases, suitable gearing would be necessary between the motor output shaft and the ball nut to rotate the ball nut. Also, an electromagnetic clutch could be used, if desired, between the motor and ball nut. Further, reduction gearing can be used between the motor and ball nut, if desired.

From the above description of the invention, those skilled in the art will perceive improvements, changes and modifications. Such improvements, changes and modifications within the skill of the art are intended to be covered by the appended claims.

Having described a preferred embodiment of the invention, what is claimed is:

1. A steering gear for turning steerable vehicle wheels comprising:
    an elongate member having a screw thread portion adjacent one end thereof and a rack portion adjacent the other end thereof;
    linkage pivotally connected to said elongate member for turning the steerable vehicle wheels upon movement of said elongate member;
    a rotatable pinion gear meshing with said rack portion of said elongate member;
    an electric motor adjacent said screw thread portion of said elongate member;
    a ball nut rotatable by said electric motor and cooperating with said screw thread portion to move said elongate member axially upon rotation of said ball nut; and
    means intermediate said screw thread portion and said rack portion attaching said linkage to said elongate member to effect axial movement of said linkage upon axial movement of said elongate member.

2. A steering gear as set forth in claim 1 wherein said electric motor is disposed coaxially of said ball nut and is axially spaced relative thereto.

3. A steering gear as set forth in claim 2 wherein said electric motor includes a tubular member having an end portion drivingly connected with an end portion of said ball nut.

4. A steering gear as set forth in claim 1 further including an elongate central housing member supporting said elongate member for axial movement relative thereto, said elongate central housing member having surfaces defining a slot therein intermediate the ends of said elongate central housing member and extending in a direction parallel to the longitudinal axis of said elongate central housing member.

5. A steering gear as set forth in claim 4 wherein said linkage is connected to said elongate member by fasteners which extend through said slot.

6. A steering gear as set forth in claim 4 further including a tubular bearing encircling and engaging a portion of said screw thread portion, said tubular bearing being received in said elongate central housing member and being radially movable relative thereto.

7. A steering gear for turning steerable vehicle wheels comprising:
    an elongate member having a screw thread portion adjacent one end thereof and a rack portion adjacent the other end thereof;
    a rotatable pinion gear meshing with said rack portion of said elongate member;
    a linkage pivotally connected to said elongate member for turning steerable vehicle wheels upon movement of said elongate member;
    means between said screw thread portion and said rack portion attaching said linkage to said elongate member to effect axial movement of said linkage upon axial movement of said elongate member;
    a ball nut coaxial with said screw thread portion and rotatable relative to said screw thread portion to effect axial movement of said elongate member; and
    an electric motor having a rotary armature which is coaxial with said ball nut and axially spaced from said ball nut for driving said ball nut;
    said electric motor having a tubular output drive shaft;
    said screw thread portion of said elongate member having an end located in said tubular output drive shaft and within the axial extent of said electric motor when the steerable vehicle wheels are positioned in a straight-ahead position and movable therefrom to a location within the axial extent of said ball nut when the vehicle wheels are in at least one turned position.

8. A steering gear as set forth in claim 7 further including an elongate central housing member supporting said elongate member for axial movement relative thereto, said elongate central housing member having surfaces defining a slot therein intermediate the ends of said elongate central housing member and extending in a direction parallel to the longitudinal axis of said elongate central housing member.

9. A steering gear as set forth in claim 8 wherein said means attaching said linkage to said elongate member comprises fasteners extending through said slot.

10. A steering gear as set forth in claim 8 further including a tubular bearing encircling and engaging a portion of said screw thread portion, said tubular bearing received in said elongate central housing member and being radially movable relative thereto.

11. A steering gear for turning steerable vehicle wheels comprising:
    an elongate central housing member;
    an elongate member having a screw thread portion adjacent one end thereof and a rack portion adjacent the other end thereof, said screw thread portion projecting beyond one end of said elongate central housing member and said rack portion projecting beyond the other end of said elongate central housing member;
    a rotatable pinion gear;
    a pinion gear housing supporting said input shaft and said pinion gear for rotation;
    means for releasably attaching one end of said elongate central housing member to said pinion gear housing;
    the other end of said elongate central housing member having an enlarged diameter chamber therein;
    a ball nut located in said chamber and encircling said screw thread portion of said elongate member;
    an electric motor coaxial with said ball nut and spaced therefrom, said electric motor driving said ball nut to apply axial force to said elongate member to move said elongate member axially, said electric motor having a housing;

means for releasably attaching said electric motor housing to the other end of said elongate central housing member;

surfaces defining an elongate slot in said elongate central housing member intermediate the ends thereof;

a linkage pivotally connected to said elongate member for turning the steerable vehicle wheels upon movement of said elongate member; and means extending through said slot in said elongate central housing member for connecting said linkage to said elongate member intermediate said screw thread portion and said rack portion for moving said linkage upon axial movement of said elongate member.

12. A steering gear as set forth in claim 11 wherein said pinion gear housing has a tubular portion extending therefrom for axially receiving a portion of said elongate central housing member therein.

13. A steering gear as set forth in claim 11 wherein said electric motor housing has a tubular portion extending therefrom for axially receiving a portion of said elongate central housing member therein.

14. A steering gear as set forth in claim 11 further including a tubular bearing encircling and engaging a portion of said screw thread portion, said tubular bearing received in said elongate central housing member and being radially movable relative thereto.

15. A steering gear for turning steerable vehicle wheels comprising:

housing means;

an elongate member supported for axial movement by said housing means and having a screw thread portion adjacent one end thereof and a rack portion adjacent the other end thereof;

a pinion gear in meshing engagement with said rack portion of said elongate member and supported for rotation by an end portion of said housing means;

the other end portion of said housing means having an enlarged diameter chamber therein;

a ball nut located in said chamber and encircling said screw thread portion of said elongate member;

an electric motor supported by said housing means and disposed coaxial with said ball nut and spaced therefrom, said electric motor driving said ball nut to apply axial force to said elongate member to move said elongate member axially;

surfaces defining an elongate slot in said housing means;

a linkage for turning the steerable vehicle wheels upon movement of said elongate member; and means projecting through said slot in said housing means to pivotally connect said linkage to said elongate member.

* * * * *